United States Patent
Burnett

(10) Patent No.: US 6,813,936 B2
(45) Date of Patent: Nov. 9, 2004

(54) GOLF BALL EQUATOR LOCATING APPARATUS

(75) Inventor: Kenneth Burnett, Lincolnwood, IL (US)

(73) Assignee: Techansonic Electronics Inc., Lincolnwood, IL (US)

(*) Notice: Subject to any disclaimer, the term of this patent is extended or adjusted under 35 U.S.C. 154(b) by 0 days.

(21) Appl. No.: 10/337,508

(22) Filed: Jan. 7, 2003

(65) Prior Publication Data

US 2003/0213289 A1 Nov. 20, 2003

Related U.S. Application Data

(60) Provisional application No. 60/346,589, filed on Jan. 8, 2002.

(51) Int. Cl.[7] .............................................. A63B 53/00
(52) U.S. Cl. ..................................................... 73/65.03
(58) Field of Search ............................. 73/65.01, 65.02, 73/65.03, 65.07

(56) References Cited

U.S. PATENT DOCUMENTS

| | | | |
|---|---|---|---|
| 4,546,644 A | | 10/1985 | Beny et al. ..................... 73/65 |
| 4,804,220 A | * | 2/1989 | Rosheim ....................... 294/111 |
| D301,554 S | | 6/1989 | Ogawa .......................... D10/82 |
| 5,611,723 A | * | 3/1997 | Mitoma et al. ................. 451/6 |
| 6,165,049 A | * | 12/2000 | Yamaguchi ..................... 451/6 |

OTHER PUBLICATIONS

Copy of Pamphlet, *circa* Late Jan. 2001.
Copy of Package Insert, *circa* Late Jan. 2001.
Copy of Box *circa* Late Jan. 2001.
Article in "Partners", Nov./Dec. 2001, p. 22.

* cited by examiner

*Primary Examiner*—Max Noori
(74) *Attorney, Agent, or Firm*—Much Shelist; Adam K Sacharoff

(57) ABSTRACT

An apparatus for locating and marking the equator of a golf ball. A rotation plate shaped to support a golf ball is provided in a housing. The housing encloses a motor and the motor is attached to the rotation plate and is capable of imparting spin on the rotation plate. A guard has a ring and a cross-beam with a marking opening defined therein extending from the ring. A means for supplying power to the motor and controlling the motor are provided.

2 Claims, 6 Drawing Sheets

GOLF BALL EQUATOR LOCATING APPARATUS

RELATED APPLICATIONS

The present patent document claims the benefit of the filing date under 35 U.S.C. §119(e) of Provisional U.S. Patent Application Ser. No. 60/346,589, filed Jan. 8, 2002, which is hereby incorporated by reference.

BRIEF DESCRIPTION OF THE PRESENTLY PREFERRED EMBODIMENTS

The present invention provides an apparatus for locating and marking the equator of a golf ball. This is necessary since, as a result of the methods and materials used to manufacture golf balls, many of the balls exhibit imperfections in their center of gravity. Oftentimes, the center of gravity of a golf ball is offset from the geometric center of the ball. These imperfections result in unpredictable behavior in the path of the ball upon rolling or striking it.

By locating the equator of each golf ball, a player can attain the truest path of travel by lining the equator up with the target and striking the ball perpendicular to the equator. This works equally well whether putting or driving the golf ball. The apparatus of the present invention provides a quick and easy way to mark the equator of the ball. The apparatus utilizes a motor in a housing to spin the golf ball in order to locate the equator. Numerous ways to supply power to and control the motor are also provided.

DETAILED DESCRIPTION OF THE PRESENTLY PREFERRED EMBODIMENTS

Figure 1:
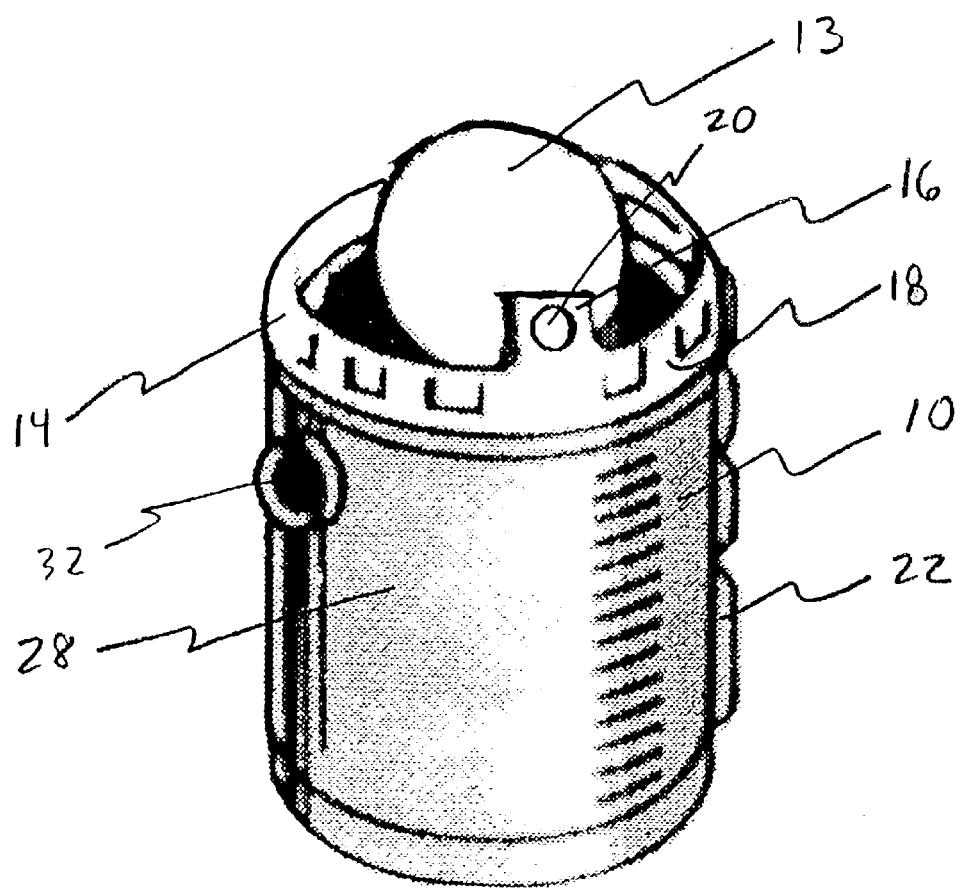
FIG. 1 is a perspective view of an embodiment of the present invention.
Figure 2:
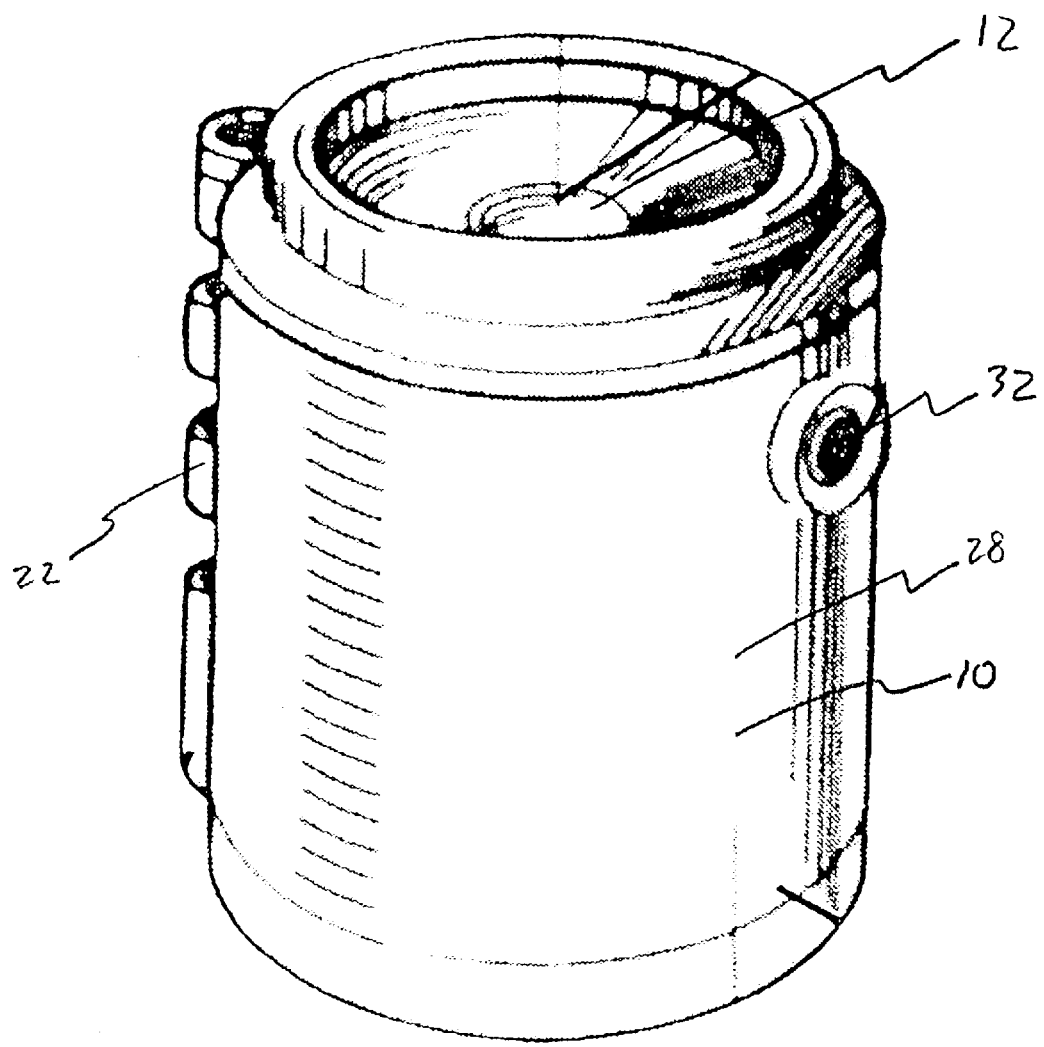
FIG. 2 is a perspective view of the embodiment of FIG. 1 with the guard removed.
Figure 3:
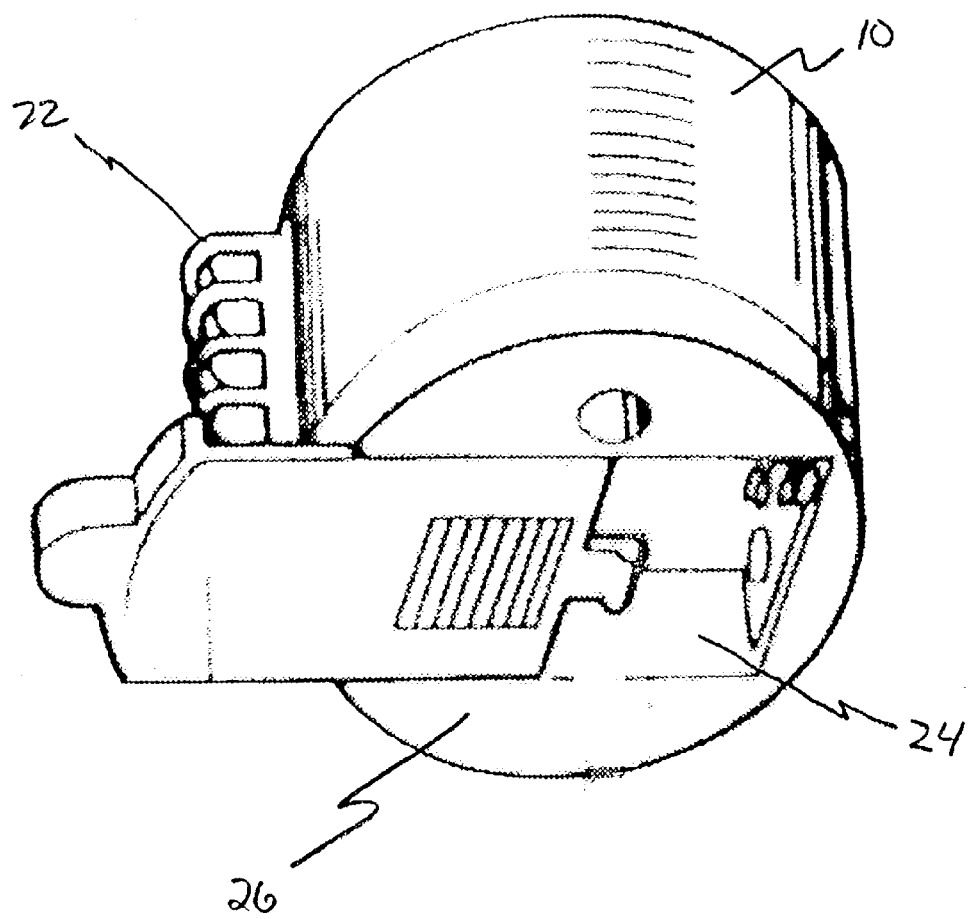
FIG. 3 is a bottom perspective view of the embodiment of FIG. 1.

Referring in combination to FIGS. 1–3, a first preferred embodiment of the present invention is illustrated. Preferably, a circular housing 10 encloses a DC motor (not shown) that is connected to a rotation plate 12. The rotation plate 12 is preferably formed from a material that allows the golf ball 13 to spin within the rotation plate 12 yet not become completely dislodged from the rotation plate 12. The DC motor preferably spins the rotation plate 12 at several thousand RPM.

Preferably, the apparatus of the present invention has a guard 14 positioned on the housing 10 over the rotation plate 12. The guard 14 preferably has at least a first cross-beam 16. The cross-beam 16 is attached to a ring 18 having a circumference large enough to fit over the outer diameter of the housing 10. The guard 14 is preferably removable.

The cross-beam 16 has a marking opening 20. This opening 20 is preferably positioned such that the equator of a golf ball 13 is substantially aligned with the opening 20 when a golf ball 13 is placed on the rotation plate 12. The diameter of the opening 20 is preferably sized such that the tip of a marker (not shown) can fit through the opening 20 and come into contact with the outer diameter of a golf ball 13 in place on the rotation plate 12. The opening 20 also preferably prevents the marker from moving the golf ball 13 off-center.

Figure 4:
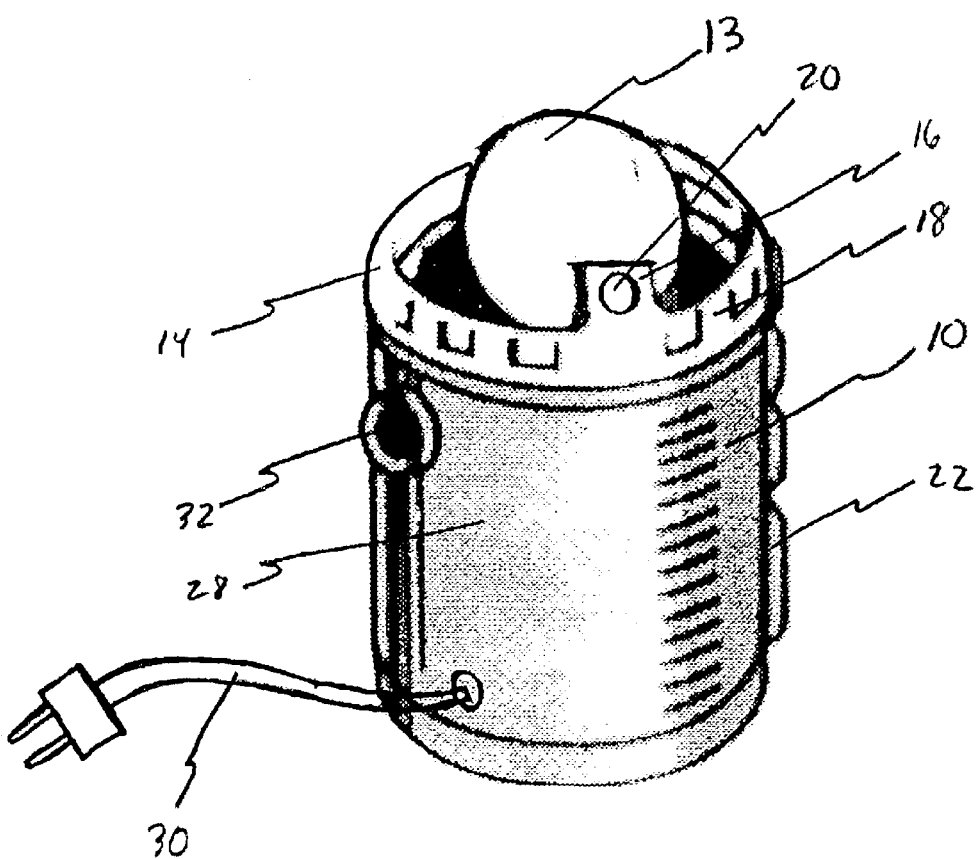
FIG. 4 is a perspective view of an embodiment of the present invention utilizing a power cord.

The apparatus of the present invention also preferably includes a holder 22 defined on the side of the housing 10 sized to hold the marker when it is not in use. Many different means may be used to control the supply of power to the motor. In one embodiment, shown in FIG. 3, a battery compartment 24 is provided on the bottom 26 of the housing 10 for the insertion of two AA dry-cell batteries (not shown). Other types of batteries could be used and the compartment 24 could be re-sized to accommodate them. It is also possible to position the battery compartment 24 on the side 28 of the housing 10 if desired. In an alternative embodiment, shown in FIG. 4, a power cord 30 is provided in order to connect the apparatus to an external AC power source (not shown).

Figure 5:
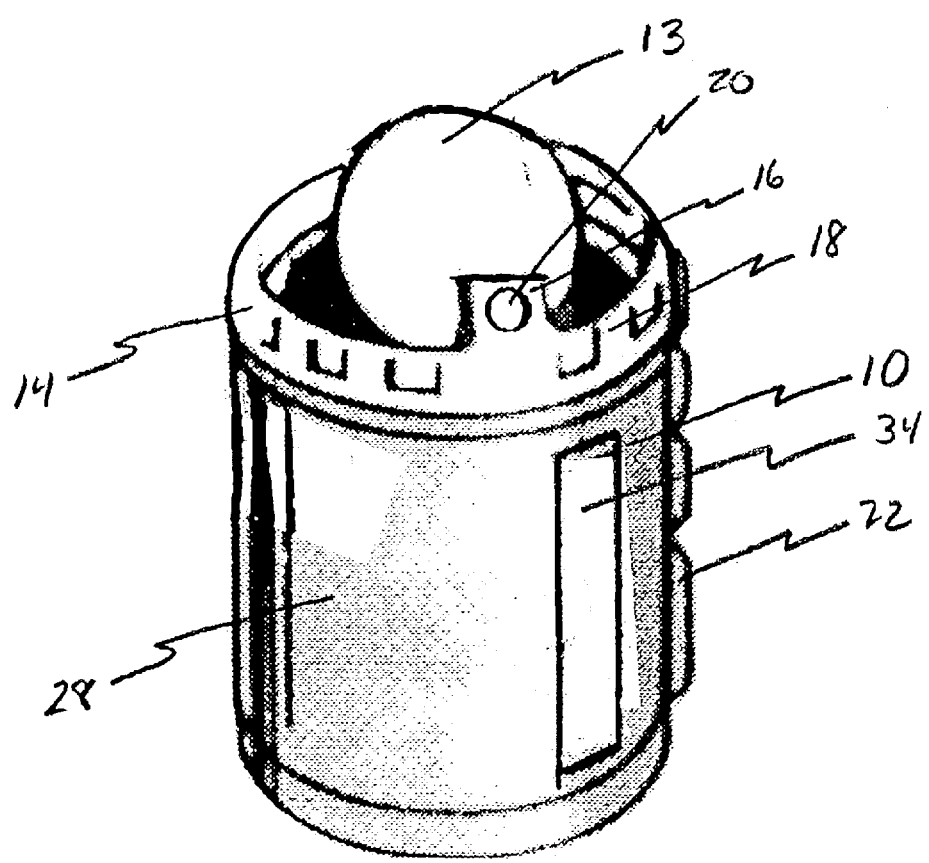
FIG. 5 is a perspective view of an embodiment of the present invention utilizing metal touch pads.
Figure 6:
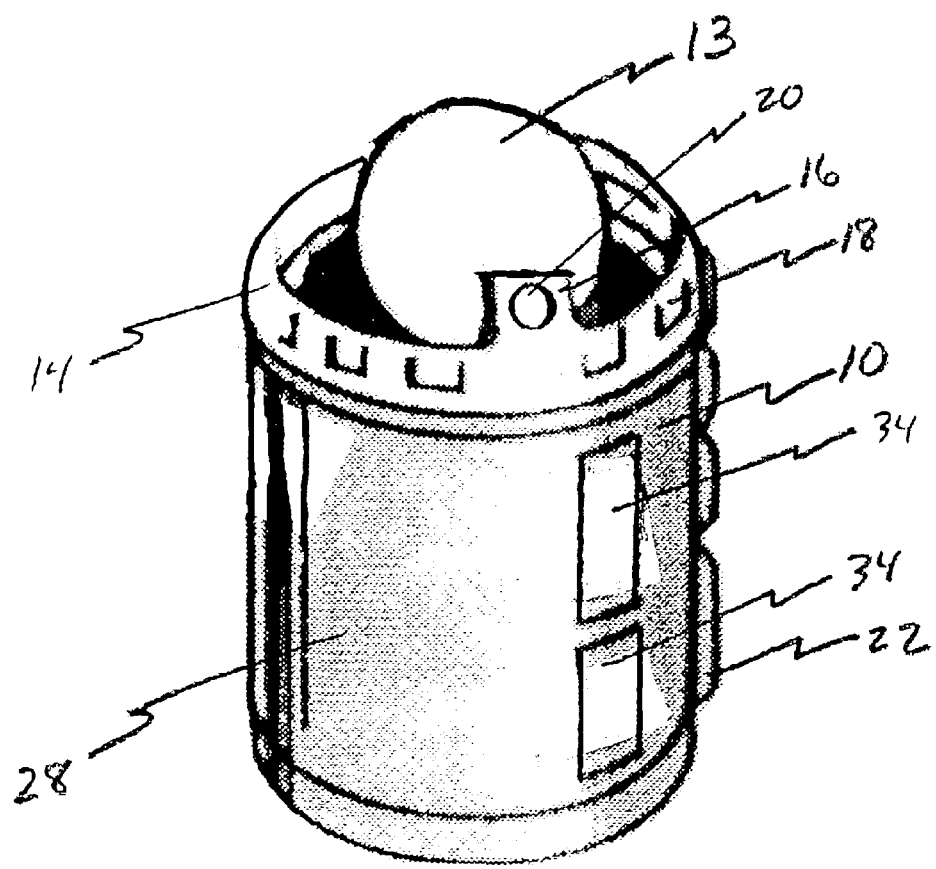
FIG. 6 is a perspective view is an embodiment of the present invention utilizing a alternative arrangement of metal touch pads.

The apparatus of the present embodiment also preferably includes a means for controlling the motor. If a power cord 30 is used, the circuit is always be complete, and the motor turns on when the power cord 30 is connected to the external power source. Alternatively, a button 32 may be provided in order to complete the circuit and turn the motor on. In order to complete the circuit and impart spin on the golf ball 13, an operator presses on the button 32. In yet another embodiment of the present invention, shown in FIG. 5, two touch pads 34 are provided. In the embodiment shown in FIG. 5, only one of the touch pads 34 can be seen. The other touch pad 34 is on the opposite side of the housing 10. When an operator holds the housing 10, the operator's hand comes in contact with both of the touch pads 34 and completes the circuit. Preferably, the touch pads 34 are formed from a conductive material such as metal, for example. Alternatively, as shown in FIG. 6, the touch pads 34 may both be located on one side 28 of the housing 10.

The apparatus of the present embodiment provides a compact, easy way to locate the equator of a golf ball 13. In operation, an operator places a golf ball 13 on the rotation plate 12. The guard 14 is placed on the housing 10 and the circuit is completed so that power is supplied to the motor. The motor spins the rotation plate 12, preferably at several thousand RPM. As the rotation plate 12 spins, spin is imparted on the golf ball 13 as well. If the center of gravity of the golf ball 13 is not aligned with the geometric center of the ball 13, internal forces induced by the rotation of the ball 13 will cause the ball 13 to shift in relation to the rotation plate 12 so that the center of gravity of the ball 13 becomes aligned with the axis of rotation of the rotation plate 12. The alignment process preferably takes about 20–40 seconds.

Once the operator observes that the ball 13 has stopped moving relative to the rotation plate 12 and is spinning in a constant position, the ball 13 may be marked. Preferably, while the ball 13 is still rotating, the marker is inserted into the opening 20 in the cross-beam 16 of the guard 14. The marker is preferably held in contact with the surface of the ball 13 until a line is observed on the ball 13 around the entire circumference of the ball 13. At this point, power can be cut off to the motor and the ball 13 is allowed to stop spinning. Other means such as painting or scratching the ball 13 with a sharp implement (not shown) inserted in the opening 20 could also be used to mark the equator of the ball 13.

The result is a line around the true equator of the golf ball 13. Before striking the golf ball 13, the user can align the equator so that the line is pointing toward the target. The effect is an increase in accuracy and distance when striking the ball 13.

It should be noted that there could be a wide range of changes made to the present invention without departing from its scope. Thus, it is intended that the foregoing detailed description be regarded as illustrative rather than limiting and that it be understood that it is the following claims, including all equivalents, which are intended to define the scope of the invention.

I claim:

1. An apparatus for locating and marking the equator of a golf ball comprising:

a housing having a top portion;

a rotation plate shaped to support said golf ball;

a motor attached to said rotation plate, said motor capable of spinning said rotation plate with said golf ball thereon to spin said golf ball into stable alignment;

an annular guard positioned on the top portion of said housing, said guard having a ring extending upwardly a predetermined distance to surround at least a portion of said golf ball to prevent said golf ball from spinning off said rotation plate when said rotation plate is spinning, and said guard having a marking opening position at a distance substantially about the equator of said golf ball when said golf ball is supported on said rotation plate, said marking opening sized to receive a marking instrument for marking said golf ball when said golf ball is spinning in stable alignment;

a means for supplying power to said motor; and a means for controlling the motor.

2. An apparatus for locating and marking an equator defined on a golf ball, the apparatus comprising:

a housing having a top portion;

a plate shaped to support a golf ball rotatably attached to the top portion, said plate when rotating is capable of imparting spin on the golf ball supported by said plate;

a motor secured in said housing to rotate said plate with said golf ball thereon to spin said golf ball into a stable alignment for marking;

an annular guard positioned on the top portion of the housing and extending upwardly to surround at least a portion of said golf ball to prevent said golf ball from spinning off said rotation plate; and an opening on said annular guard at a height substantially equal to the equator defined on said golf ball supported on said plate, said opening sized to receive a marking instrument for marking said golf ball when said golf ball is spinning in said stable alignment, whereby when said motor rotates the plate, the golf ball moves into said stable alignment such that said golf ball may be marks through said opening.

\* \* \* \* \*